United States Patent [19]

Mezger et al.

[11] Patent Number: 5,691,469
[45] Date of Patent: Nov. 25, 1997

[54] METHOD OF DETECTING COMBUSTION MISFIRES

[75] Inventors: Manfred Mezger, Markgröningen; Andrea Lohmann, Stuttgart; Klaus Ries-Müller, Bad Rappenau; Jürgen Förster, Chemnitz, all of Germany

[73] Assignee: Robert Bosch GmbH, Stuttgart, Germany

[21] Appl. No.: 705,146

[22] Filed: Aug. 29, 1996

[30] Foreign Application Priority Data

Aug. 29, 1995 [DE] Germany ............ 195 31 845.5

[51] Int. Cl.$^6$ ........................ G01M 15/00
[52] U.S. Cl. .............. 73/117.3; 123/419; 123/436; 364/431.07
[58] Field of Search ................ 73/116, 117.2, 73/117.3; 123/419, 436; 364/431.07, 431.08

[56] References Cited

U.S. PATENT DOCUMENTS

| | | | |
|---|---|---|---|
| 4,424,709 | 1/1984 | Meier, Jr. et al. | 73/117.3 |
| 5,200,899 | 4/1993 | Ribbens et al. | 364/431.08 |
| 5,239,473 | 8/1993 | Ribbens et al. | 364/431.08 |
| 5,263,365 | 11/1993 | Müller et al. | 73/117.3 |
| 5,303,158 | 4/1994 | Kuroda | 364/431.08 |
| 5,379,634 | 1/1995 | Kuroda et al. | 73/116 |
| 5,387,253 | 2/1995 | Remboski, Jr. et al. | 73/117.3 |
| 5,394,330 | 2/1995 | Horner | 364/431.08 |
| 5,487,008 | 1/1996 | Ribbens et al. | 73/116 |

FOREIGN PATENT DOCUMENTS

| | | |
|---|---|---|
| 0709664 | 5/1996 | European Pat. Off. |
| 2260194 | 4/1993 | United Kingdom |
| WO 95/07450 | 3/1995 | WIPO |

*Primary Examiner*—George M. Dombroske
*Attorney, Agent, or Firm*—Walter Ottesen

[57] ABSTRACT

The invention is directed to a method for detecting combustion misfires in an internal combustion engine on the basis of a first signal wherein the nonuniformity of the rotational movement of the crankshaft of the engine is imaged. The method includes the steps of: generating a second signal which is periodic and has a period duration corresponding to one of the following: the cycle duration of a complete work cycle of the engine or the cycle duration divided by a whole number, and the second signal having a fixed phase relationship to the rotational movement of said crankshaft; providing an ancillary signal based on the first signal; modulating the second signal with the ancillary signal and filtering the second signal to form a third signal; and, utilizing the third signal for detecting the presence of misfires and for identifying the cylinder affected by the misfires.

5 Claims, 6 Drawing Sheets

FIG. 3(a)
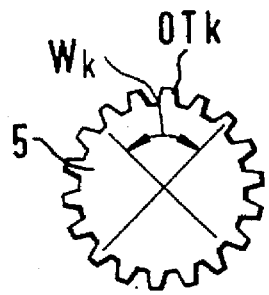
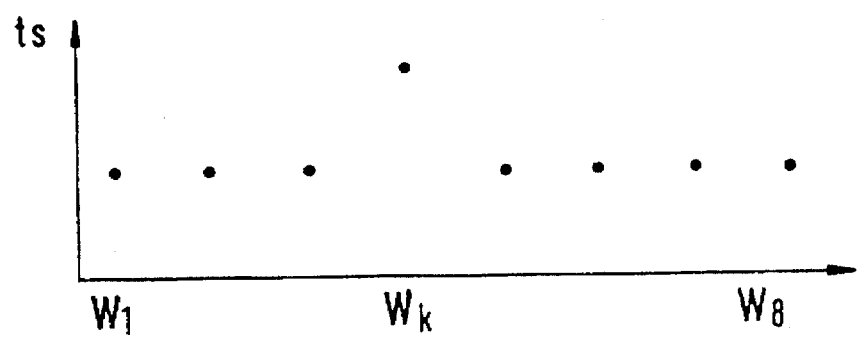
FIG. 3(b)
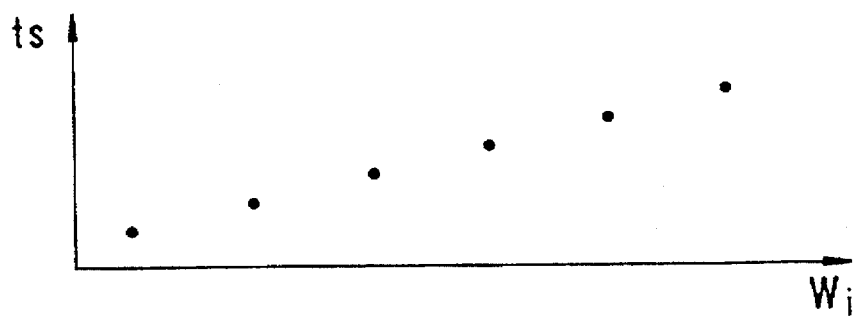
FIG. 3(c)

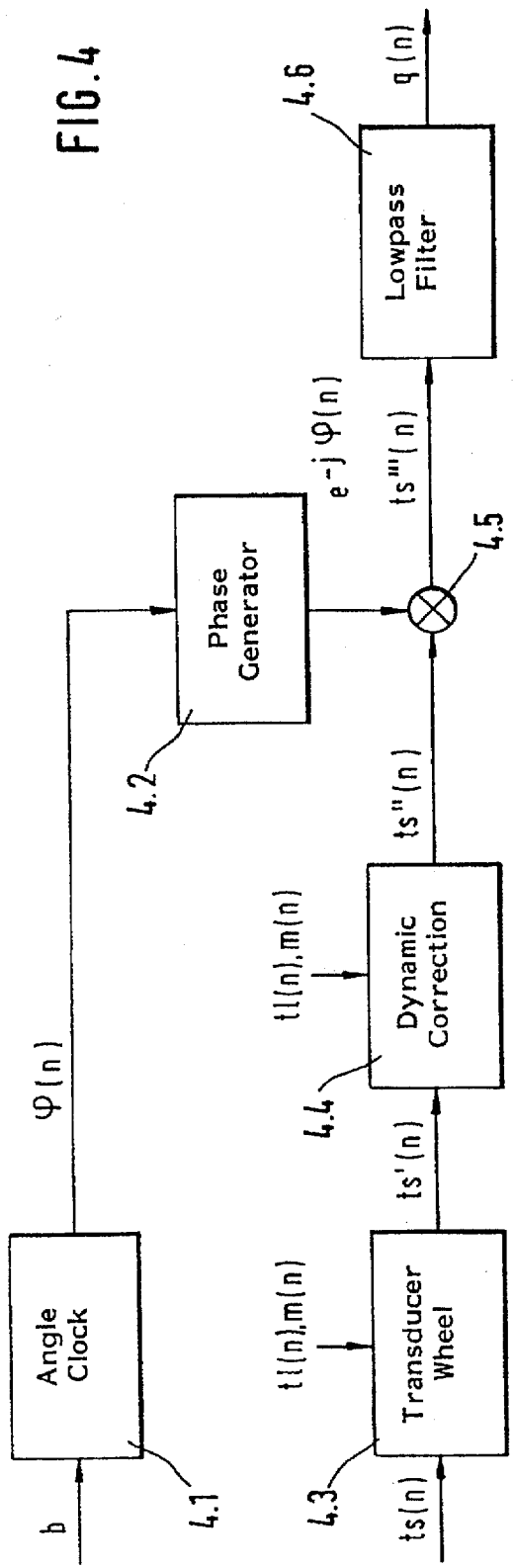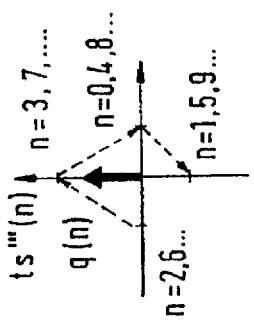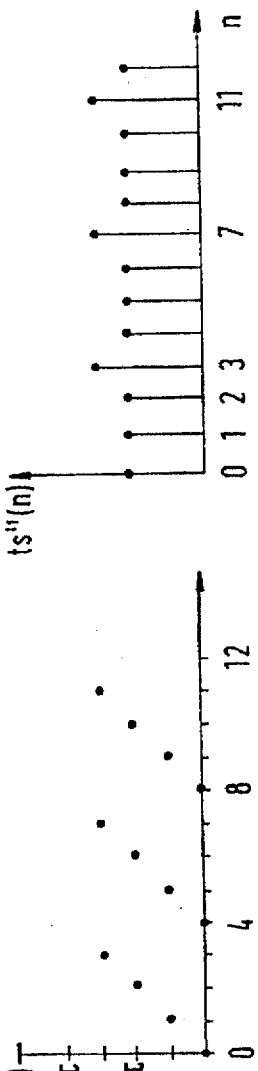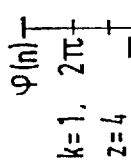

METHOD OF DETECTING COMBUSTION MISFIRES

FIELD OF THE INVENTION

The invention relates to a method for detecting combustion misfires in internal combustion engine such as in motor vehicles.

BACKGROUND OF THE INVENTION

Combustion misfires lead to an increase of the toxic substances emitted during operation of the engine and can, in addition, lead to damage of the catalytic converter in the exhaust-gas system of the engine. A detection of combustion misfires in the entire rpm and load ranges is necessary to satisfy statutory requirements as to on-board monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A detection system for combustion misfires includes the following function blocks: sensors, signal processing and feature extraction as well as classification. The sensors detect, for example, segment times, that is, the time intervals in which the crankshaft passes through a predetermined rotational angle. Criterion signals are formed from the segment times in the feature extraction block. The classification block follows the feature extraction block and combustion misfires are detected from the criterion signals, for example, by threshold value comparisons or by utilizing a neural network or other known methods.

A system operating on the basis of threshold-value comparisons is already known and disclosed in German patent publication 4,138,765 which corresponds to U.S. patent application Ser. No. 07/818,884, filed Jan. 10, 1992, now abandoned.

In this known method, the segments are realized, for example, by markings on a transducer wheel coupled to the crankshaft. The segment time in which the crankshaft passes through this angle range is dependent, inter alia, upon the energy converted in the combustion stroke. Misfires lead to an increase of the ignition-synchronously detected segment times. Pursuant to the known method, a criterion for the rough-running of the engine is computed from the differences of the segment times. In addition, slow dynamic operations such as the increase of the engine rpm for vehicle acceleration are mathematically compensated. A rough-running value, which is computed in this way for each ignition, is likewise compared ignition-synchronously with a predetermined threshold value. Exceeding this threshold value is evaluated as a misfire. The threshold value is dependent, as may be required, from operating parameters such as load and engine speed (rpm). This method is then based on the feature extraction in the time range.

Additional methods are known from U.S. Pat. Nos. 5,200,899 and 5,239,473 wherein the transformation of rpm signals in the frequency range by means of discrete fourier transformations is used for feature extraction. The display of the results indicates a block-like application of the transformation to the rpm signals. A block is formed of, for example, m rpm signals. The rpm signals are determined during a camshaft revolution. However, individual misfires are not optimally resolved in this way. In contrast, if the transformation is performed sequentially, that is, if the evaluation block of m rpm signals is shifted by less than a camshaft rotation, then disadvantages result with respect to the detection of permanent misfires.

The reliability with which misfires can be detected in accordance with the known methods becomes poorer the less individual misfires affect the rpm of the crankshaft. The reliability therefore drops with increasing number of cylinders of the internal combustion engine and with an increasing rpm as well as with reducing load.

A reduced reliability with respect to detection increases the risk of defective detection. Furthermore, the complexity of the application to adapt the method to different operating states becomes greater.

SUMMARY OF THE INVENTION

In view of the foregoing, it is an object of the invention to provide a method which improves the reliability of misfire detection in internal combustion engines having a high number of cylinders even at high engine speeds and low load.

The method of the invention is for detecting combustion misfires in an internal combustion engine on the basis of a first signal wherein the nonuniformity of the rotational movement of the crankshaft of the engine is imaged. The method includes the steps of: generating a second signal which is periodic and has a period duration corresponding to one of the following: the cycle duration of a complete work cycle of the engine or the cycle duration divided by a whole number and, the second signal having a fixed phase relationship to the rotational movement of the crankshaft; providing an ancillary signal based on the first signal; modulating the second signal with the ancillary signal and filtering the second signal to form a third signal; and, utilizing the third signal for detecting the presence of misfires and for identifying the cylinder affected by the misfires.

The invention relates to signal processing and feature extraction. It is the essence of the invention to subject the signal supplied by the sensors to a modulation process as well as to a filtering operation. For the modulation, a periodic signal, which is in phase synchronism with the rotational movement of the camshaft, is generated and the parameter of this signal is subsequently influenced by the signal supplied by the sensors. This signal can, if required, be already processed. The sequence of modulation and filtering can be exchanged in the invention. It is especially advantageous, however, to provide a realization with filtering which is preceded by modulation.

The signal utilized in the invention has a phase position synchronous to the rotational movement of the camshaft. For this reason, the modulated signal likewise receives a camshaft synchronous phase position. In this way, detected combustion misfires can be allocated to the particular cylinder.

BRIEF DESCRIPTION OF THE DRAWINGS

The invention will now be described with reference to the drawings wherein:

FIGS. 3a and 3b show the known principle for forming segment times as the basis of a measure or criterion for the rough-running on the basis of rpm measurements;

FIG. 3c shows the influence of changes in rpm on the detection of time durations ts;

FIG. 4 shows a first embodiment of the invention in the context of a function block diagram;

FIG. 4a is a graph showing the output signal φ(n) of block 4.1 for a four cylinder engine;

FIG. 4b is a graph showing detected segment times ts"(n) as a function of engine speed (n);

FIG. 4c is a graph of signal values displayed as points in a complex plane;

DESCRIPTION OF THE PREFERRED EMBODIMENTS OF THE INVENTION

Figure 1:
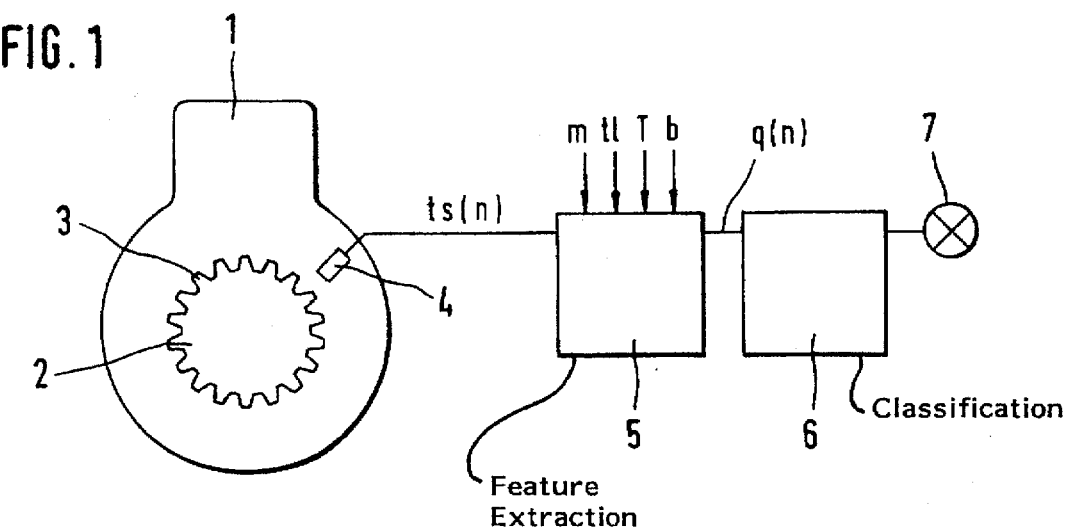
FIG. 1 is a schematic representation of an engine and a control apparatus to show the setting in which the method of the invention is applied.

FIG. 1 shows an internal combustion engine 1 which includes the following: a sensing device comprising an angle transducer wheel 2 which carries markings 3 and an angle sensor 4; a block 5 symbolizing the feature extraction; a block 6 symbolizing the classification; and, a device 7 for displaying the occurrence of combustion misfires. The angle transducer wheel is coupled to the crankshaft of the internal combustion engine and the rotational movement thereof is converted into an electrical signal with the aid of the angle sensor 4 realized as an inductive sensor. The periodicity of the electrical signal defines an image of the periodic passing of the markings 3 at the angle sensor 4. The time duration between an increase and a decrease of the signal level therefore corresponds to the time in which the crankshaft rotates further over an angular range corresponding to the extent of the marking.

The segment times are further processed in the following stages.

Figure 2:
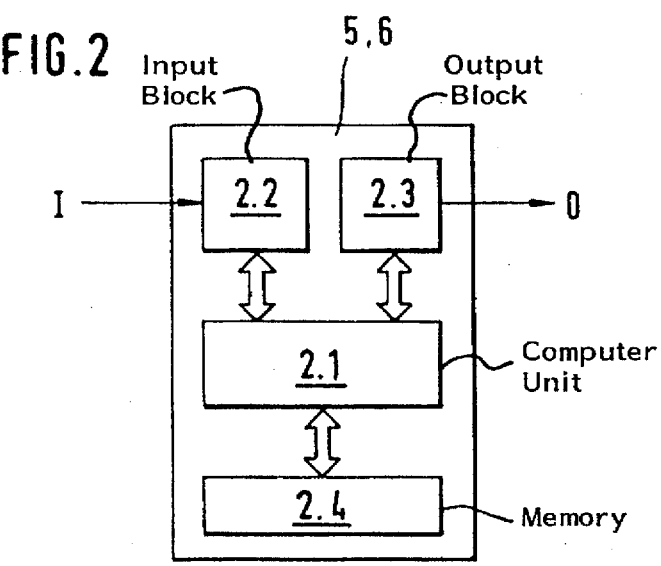
FIG. 2 is a schematic of a computer suitable for carrying out the method of the invention.

The computer used for this purpose can, for example, be configured as shown in FIG. 2. A computer unit 2.1 negotiates between an input block 2.2 and an output block 2.3 while using programs and data stored in a memory 2.4.

FIG. 3a shows a subdivision of the angle transducer wheel into four segments wherein each segment has a predetermined number of markings. The marking OTk is that of top dead center of a piston movement of the k-th cylinder of an internal combustion engine which, in this embodiment, is an eight-cylinder engine (z=8). The top dead center point lies in the combustion stroke of this cylinder. A rotational angular range $W_k$ is defined about this point and extends in this embodiment over one quarter of the markings of the angle transducer wheel.

In the same manner, angular ranges $W_1$ to $W_8$ are assigned to the combustion strokes of the remaining cylinders with a four-stroke principle being assumed wherein the crankshaft rotates twice for each complete work cycle. For this reason, the range $W_1$ of the first cylinder corresponds to the range $W_5$ of the fifth cylinder and so on. The position and length of the segments can be changed specifically with respect to application.

In view of the above, overlapping segments are possible. Thus, more than (z) segments per camshaft rotation or different positions of the segments with respect to top dead center of the cylinder are possible. The use of segment time signals as input signals for the feature-extraction stage is therefore advantageous because this input signal can be computed in engine control from signals which are already present. Mechanical tolerances of the angle transducer wheel can be mathematically compensated as disclosed in U.S. Pat. No. 5,263,365 incorporated herein by reference.

In lieu of the segment times, the mean rpm course, which is assigned to the individual crankshaft angle ranges, can be utilized as an input signal.

The above introduced division with (z) segments per camshaft rotation is used in the following embodiments as an example.

Further input signals of the feature extraction stage are the following: engine rpm (n), load t1, temperature T and a signal b for identifying the first cylinder.

In FIG. 3b, the times ts are plotted in which the angle ranges are passed through with the rotational movement of the crankshaft. Here, one misfire in cylinder k is assumed. The absence of torque connected with this misfire leads to an increase of the corresponding time span ts. The time spans ts then define a criterion for the rough-running which is, in principle, suitable for detecting misfires.

FIG. 3c shows the influence of rpm changes on the detection of the time durations ts. The case of a reduction in rpm is shown as typically occurs during overrun operation of a motor vehicle. This effect becomes manifest in a relatively uniform extension of the detected times ts. To compensate for this effect, it is, for example, known to form a corrective term D for dynamic compensation and to so consider this term D that the extension effect is compensated for while the rough-running value is computed.

FIG. 4 shows the block 5 of FIG. 1 in detail. The block 4.1 defines an angle clock running in synchronism with the camshaft. An identification signal b is supplied to block 4.1 and identifies a special cylinder, for example, the first cylinder. The block 4.1 generates a periodic signal φ(n) which is in phase synchronism with the camshaft rotation. The ignitions are numbered by (n). One such signal, for example, is the sawtooth-shaped angle function:

$$\phi(n) = \mathrm{mod}_{2\pi}\left(n \cdot k \cdot \frac{2\pi}{z}\right)$$

wherein z corresponds to the number of cylinders and k corresponds to the order, that is, number of fluctuation periods per camshaft revolution. The selected order determines the signal components which are utilized for the evaluation. Permanent misfires in a cylinder occur, for example, likewise with the order 1 since the permanent misfires repeat after each camshaft revolution. The following embodiments relate to the order k=1.

For a four cylinder engine (z=4), the output variable φ(n) of block 4.1 is shown in FIG. 4a for n=0 to n=12. From the output signal of block 4.1, block 4.2, as phase generator, generates the periodic fluctuation which is phase synchronous to the rotational movement of the camshaft. The fluctuation can, for example, be a complex exponential function $e^{-j \cdot \phi(n)}$. This oscillation is multiplicatively logically coupled to the segment times ts"(n) in block 4.5. The segment times supplied to block 4.5 can already be processed as indicated by the blocks 4.3 and 4.4. Block 4.3 symbolizes a transducer wheel adaptation and the block 4.4 symbolizes a dynamic correction. Both blocks can operate in dependence upon the load t1 and the engine rpm m. The blocks are advantageously used in an application of the invention.

The invention can, however, also operate without these blocks for example, when the transducer wheel signals are sufficiently precise without correction and the engine is operated in the steady state operating points. A transducer wheel adaptation compensates for mechanical inaccuracies of the transducer wheel which affect the time detection. For example, in overrun operation, times for comparable segments can be detected and compared to each other. Differences can then be applied to mechanical inaccuracies and can be compensated by mathematical corrections. In dynamic compensation, rpm changes, which extend over several segment times, are detected and their influence on an individual segment time is mathematically eliminated.

FIG. 4b shows detected and, if required, processed segment times ts"(n) for z=4 and n=0 to 12. A permanent misfire is assumed in the fourth cylinder which becomes manifest in an lengthening of the corresponding segment times for n=3, 7 and 11. By logically coupling the segment times with the signal (symbol 4.5) generated in the block 4.2, the signal values are obtained which are shown in FIG. 4c as points in the complex plane. A lowpass filtering of these signals in block 4.6, for example, according to the equation:

$$q(n) = \frac{1}{z} \sum_{i=0}^{z-1} ts(n-1)$$

supplies a feature signal q(n) as shown qualitatively in FIG. 4c as an arrow. The feature signal q(n) has, in this case, a certain magnitude (arrow length) which shows that misfires have occurred. The direction of the arrow shows that the fourth cylinder is affected by misfires. If misfires would occur in cylinder 1, then the arrow would, for example, be in the direction of the positive real axis. On the other hand, for misfires in cylinder 2, the arrow would be in the direction of the negative imaginary axis and for misfires in the third cylinder, the arrow would be in the direction of the negative real axis.

A detection of misfires and the identification of the affected cylinders is therefore possible in the context of the embodiment of the invention by evaluating the magnitude and phase of the feature signal q(n).

Figure 5:
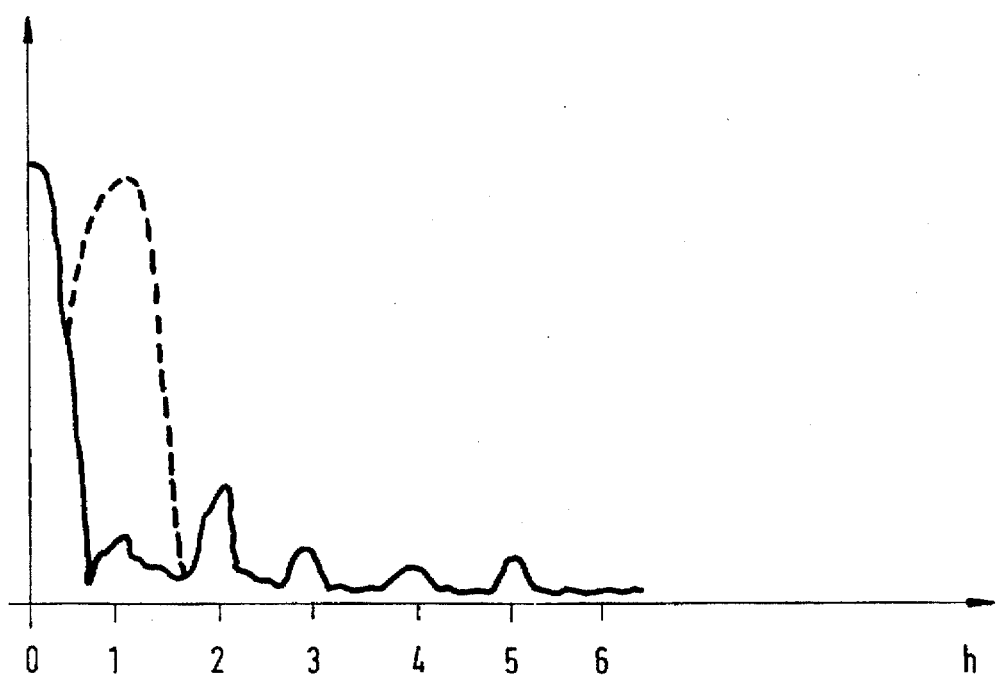
FIG. 5 is a graphical representation of the operation of the misfires in the frequency range.

FIG. 5 shows the effect of misfires in the frequency range display.

The solid line shows the portions of the frequencies of different orders in the segment time signal. The 0-th order corresponds to the steady component of the signal. The smaller maxima for the different orders k>0 can be assigned to different effects. Components of orders higher than 1 can, for example, be caused by mechanical inaccuracies of the transducer wheel. The first order corresponds to the camshaft frequency and therefore to the frequency of the permanent misfires in a cylinder (that is, a permanently disabled cylinder as opposed to one which is sporadically disabled). The solid line indicates a comparatively small signal component of the first order which is typical for misfire free operation. If, on the other hand, misfires occur in a cylinder, then this component increases significantly as is symbolized by the dotted line in FIG. 5.

In the first embodiment of the method of the invention, the modulation effects a shift of the signal spectrum by one order toward the left so that the component characteristic for a misfire moves to the position of the dc component. With the subsequent lowpass filtering, the component of the first order is separated from the remaining signal components.

The result of this frequency shift and filtering is shown in FIG. 4c in that the dc components of the signals cancel each other and only the signal component, which is caused by the misfire, remains in the form of the length of the arrow. At the same time, FIG. 4c shows that the arrow direction is independent of the position of the four values applied for lowpass filtering. In this way, the method goes beyond a pure frequency or order filtering and makes possible a cylinder identification based on phase position of the feature signal.

Figure 6A:
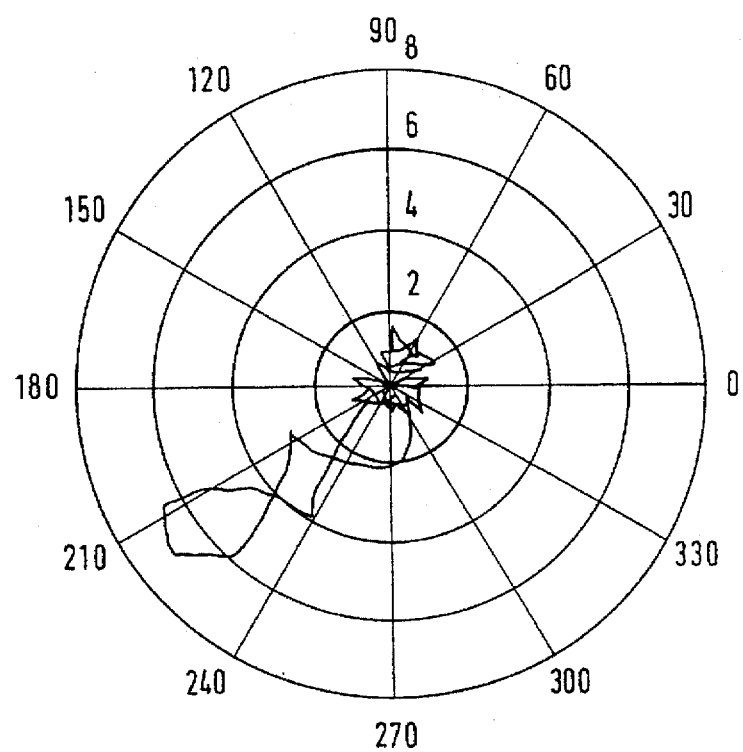
FIGS. 6a and 6b show signal traces as they occur when realizing the invention; and, FIG. 7 is a function block diagram of a second embodiment of the invention.

FIG. 6 shows measurement curves as they are detected in the realization of the method of the invention. FIG. 6a discloses a path, that is, the time-dependent course of a feature signal q(n), which is formed in accordance with the invention. The path is shown on polar coordinates with magnitude and phase angle. The feature point moves primarily in the vicinity of the center point, that is, with a small magnitude and a randomly distributed phase angle as it corresponds to misfire free operation. For an individual misfire, the point jumps into another region which is away from the center point by a certain amount and has a comparatively sharply defined phase. FIG. 6a shows that even individual misfires can be detected with the aid of the invention and assigned to a cylinder.

Figure 6B:
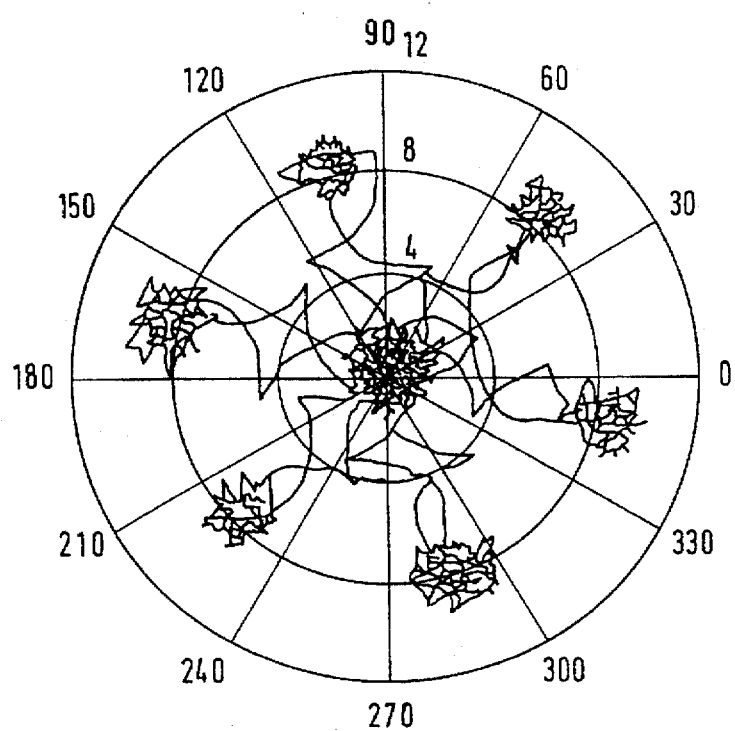

FIG. 6b shows permanent misfires in six cylinders of a 12-cylinder engine. FIG. 6a shows that the feature points of misfires in different cylinders are concentrated in clearly different regions of the coordinate system and can therefore be distinguished. Stated otherwise, the method of the invention includes an integrated phase correction so that the signal components of the individual misfires have very narrow trajectories. This, in combination with the position of the maxima, facilitates cylinder identification. Compact classification compartments having characteristic transitions result for the permanent misfires. These transitions make excellent separation possible. The feature signal q(n) formed with the method of the invention has very good characteristics for the subsequent classification stage.

Figure 7:
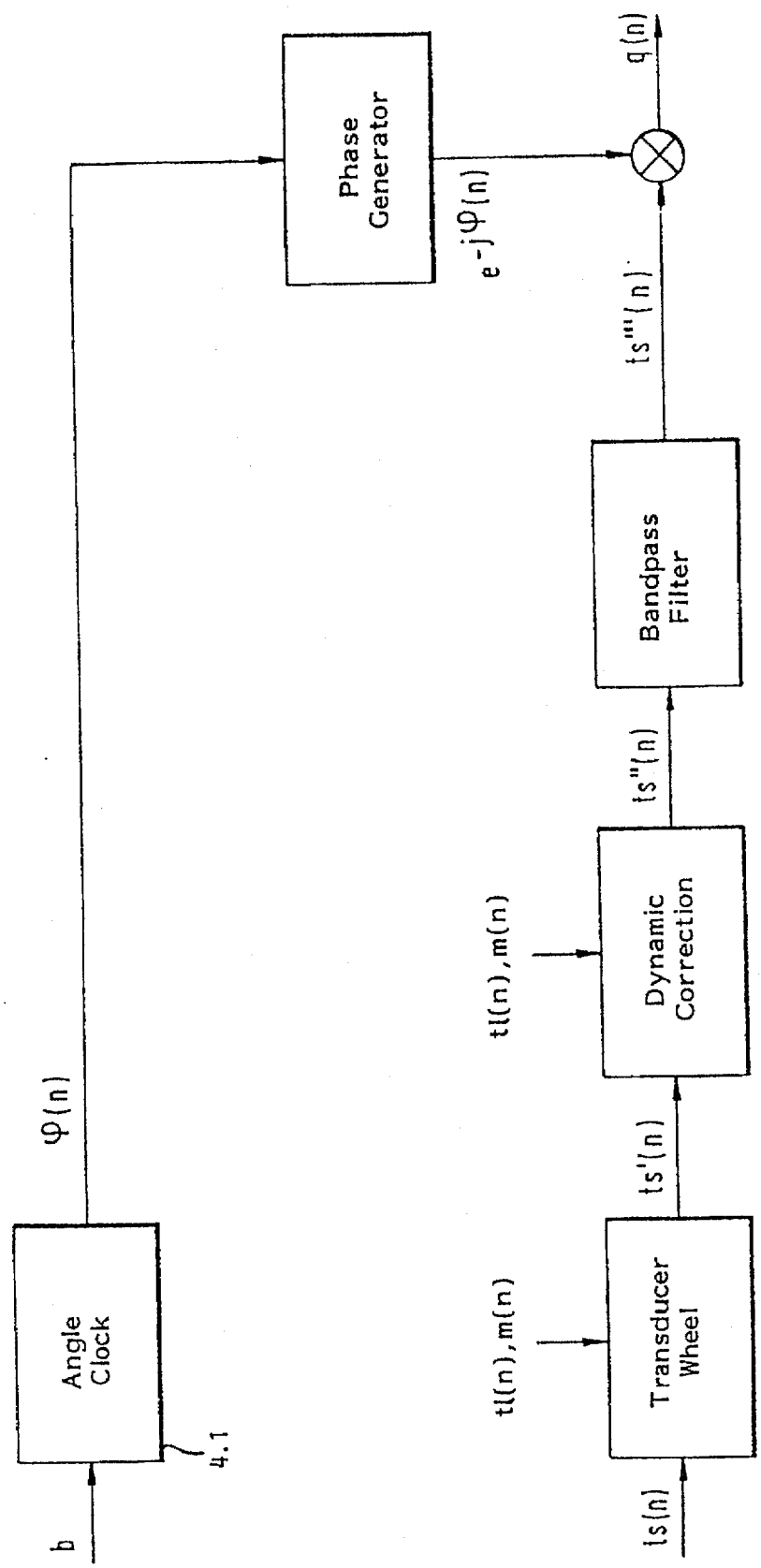

As an alternative to the embodiment of FIG. 4, the sequence of modulation and filtering can be interchanged. This is shown in FIG. 7. In contrast to FIG. 4, the lowpass filtering is replaced by a bandpass filtering. In both embodiments, negative orders can be processed.

$$ts'''(n) = \frac{1}{z} \sum_{i=0}^{z-1} ts''(n-i) \cdot e^{j2\pi i k/z}$$

$$q(n) = ts'''(n) \cdot e^{-j\psi(n)}$$

This embodiment, however, requires more complex computations.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in an internal combustion engine on the basis of a discrete first signal wherein the nonuniformity of the rotational movement of the crankshaft of the engine is imaged, the method comprising the steps of:

generating a second signal which is periodic and has a period duration corresponding to one of the following: the cycle duration of a complete work cycle of said engine or said cycle duration divided by a whole number and said second signal having a fixed phase relationship to the rotational movement of said crankshaft;

providing an ancillary signal based on said discrete first signal;

modulating said second signal with said ancillary signal and filtering said second signal to form a third signal; and, utilizing said third signal for detecting the presence of misfires and for identifying the cylinder affected by said misfires.

2. The method of claim 1, said third signal having a magnitude and phase and the method comprising the further step of drawing a conclusion as to the occurrence of a misfire from said magnitude, and a conclusion as to the affected cylinder from said phase.

3. The method of claim 1, first performing the step of modulating said second signal and then filtering the modulated signal with a lowpass filter.

4. The method of claim 1, comprising the step of first bandpass filtering said discrete first signal before modulating said second signal.

5. A method for detecting combustion misfires in an internal combustion engine on the basis of a first signal wherein the nonuniformity of the rotational movement of the crankshaft of the engine is imaged, the method comprising the steps of:

providing said first signal as a discrete first signal as a sequence of segment times (ts) which are discretely detected in accordance with the sequence of ignitions of said engine;

generating a second signal which is periodic and has a period duration corresponding to one of the following: the cycle duration of a complete work cycle of said engine or said cycle duration divided by a whole number and said second signal having a fixed phase relationship to the rotational movement of said crankshaft;

providing an ancillary signal based on said first signal;

modulating said second signal with said ancillary signal and filtering said second signal to form a third signal; and, utilizing said third signal for detecting the presence of misfires and for identifying the cylinder affected by said misfires.

* * * * *